United States Patent [19]

McCauley

[11] Patent Number: 4,700,734
[45] Date of Patent: Oct. 20, 1987

[54] WATER COLLECTING AND SPRING BOX AND GAUGING SYSTEM AND HOLDING TANK

[76] Inventor: Robert G. McCauley, 75 Marr Creek Rd., Bryson City, N.C. 28713

[21] Appl. No.: 757,464

[22] Filed: Jul. 22, 1985

[51] Int. Cl.[4] ............................................. E03B 11/02
[52] U.S. Cl. .............................. 137/236.1; 137/571; 137/577; 137/590.5; 137/593
[58] Field of Search ..................... 137/236.1, 544, 549, 137/571, 577, 590.5, 593; 405/39, 40, 41; 52/169.6

[56] References Cited

U.S. PATENT DOCUMENTS

| | | | |
|---|---|---|---|
| 585,103 | 6/1897 | Jamison | 405/39 |
| 1,102,463 | 7/1914 | Wyckoff | 137/577 X |
| 1,635,477 | 7/1927 | Hall | 137/236 X |
| 1,956,524 | 4/1934 | Byram | 137/590.5 |
| 2,690,764 | 10/1954 | Hoffmann | 137/577 X |
| 3,221,881 | 12/1965 | Weiler et al. | 52/169.6 X |
| 3,368,355 | 2/1968 | Shroyer | 405/39 |
| 3,410,302 | 11/1968 | Frick | 137/593 X |
| 3,501,918 | 3/1970 | Newton, Sr. | 137/577 X |
| 3,559,408 | 2/1971 | Earnhart | 137/236 X |
| 4,298,470 | 11/1981 | Stallings | 137/577 X |

Primary Examiner—Alan Cohan
Assistant Examiner—John A. Rivell
Attorney, Agent, or Firm—Mills & Coats

[57] ABSTRACT

The present invention relates to water collecting and spring box and gauging system and water holding tank wherein the spring box is designed to receive and collect water from a source such as a spring. Once collected in the spring box, the water is filtered prior to being directed to a water holding tank that is normally stationed near a point between the spring and location of ultimate use. The spring box includes a water inlet, a drain, and a supply outlet. The flow rate of water from the spring box is controlled by varying the height of the water level maintained in the spring box and by selectively sizing and spacing openings formed in a vertical water filter that is communicatively connected to the supply outlet.

21 Claims, 4 Drawing Figures

WATER COLLECTING AND SPRING BOX AND GAUGING SYSTEM AND HOLDING TANK

FIELD OF INVENTION

The present invention relates to water collecting and gauging systems and more particularly to a spring box and water holding tank wherein the spring box is of the type adapted to collect water from a source such as a spring and to gauge and regulate the flow therefrom to the water holding tank.

BACKGROUND OF INVENTION

Spring boxes and water holding tanks have been known in the past. Functionally, the spring box is communicatively connected to a source of water such as a spring. Water from the spring is collected and directed into the spring box. From the spring box the water is typically directed to a water holding tank where the water is stored that is generally located between the spring and the site where ultimate use takes place.

Spring boxes and water holding tanks that have been used in the past have many shortcomings and disadvantages. In this regard it has been the practice in the past to construct such of heavy concrete. This obviously makes the system difficult to handle and increases the labor required in installation. Further, it is not uncommon to find substantial leakage in and around seams and the various inlets and outlets of both the spring box and associated water holding tank. This allows surface water which carries dirt and debris to enter and/or stored water to leak out.

In addition very little design has been incorporated into such systems that gives the system the ability to gauge and regulate the flow of water through the same, especially to a water holding tank. It is common for the system to be designed such that all the water being directed to the spring box is simply passed on to the holding tank, along with the water is the dirt and debris. Further, the dirt and debris either build up in the holding tank or flows on to the plumbing system with the user's dwelling. This lack of control makes it difficult to design very efficient systems that can be used by families requiring different water capacities.

In view of the above, there has been and continues to be a need for a more effective and efficient spring box and gauging system and water holding tank.

SUMMARY AND OBJECTS OF PRESENT INVENTION

The present invention entails a new and improved water collecting and spring box and gauging system and water holding tank. Many of the disadvantages and shortcomings referred to above have been overcome by the present invention.

More particularly, the present invention comprises a water collecting and gauging system that first includes a spring box and which may include an associated water holding tank. A spring box is designed to collect water from a source such as a spring and to direct water from the spring box to a water holding tank that is generally located between the spring and the site where the water is ultimately used. The spring box is constructed of a lightweight, durable polyethylene material. Of particular significance, the spring box includes both a supply outlet and a drain with a water filter communicatively connected to the supply outlet and an overflow pipe assembly communicatively connected to the drain. The co-operation of the overflow pipe assembly and the water filter enables one to adjust the water holding capacity of the spring box and also allows one to vary the flow rate of water from the spring box.

The water holding tank also includes two water filters that are operatively associated with both the inlet and outlet of the tank. In addition the water holding tank includes a drain outlet with an associated overflow pipe.

It is, therefore, an object of the present invention to provide a water collecting and gauging system of the type including a spring box that is particularly designed to provide clean water at the ultimate site of use.

Another object of the present invention resides in the provision of a water collecting and gauging system that comprises a spring box that is designed to be communicatively connected to the source of water such as a spring in order that the spring box may be communicatively connected to a water holding tank and wherein the spring box and/or water holding tank is constructed of a lightweight, durable polyethylene material that enables the components of the system to be easily installed.

A further object of the present invention resides in the provision of a water gauging system that is designed such that the flow capacity passing from the spring box can be varied according to the needs of the ultimate user or users.

More particularly, it is an object of the present invention to provide a water collecting and gauging system of the character referred to above wherein the water level of the spring box can be adjusted and varied with respect to an upstanding water filter so as to adjust the flow rate of water passing from the spring box.

A further object of the present invention resides in the provision of a system of the character referred to above including water inlet and outlet threaded fittings that are fixed and secured so as to keep surface water out of the system.

Still a further object of the present invention resides in the provision of a water collecting and gauging system of the character referred to above where the drain outlet and other inlet and outlets of the system are designed without valves so as to make the entire system relatively inexpensive and simple to maintain.

Still a further object of the present invention resides in the provision of a spring box and associated water holding tank that is particularly designed to keep the water holding tank free of spring lizards.

Another object of the present invention resides in the provision of a spring box and associated water holding tank that is designed such that debris which settles from the water held within the spring box and the tank can be easily and conveniently removed.

Still a further object of the present invention resides in the provision of a spring box and associated water holding tank of the present invention that is designed particularly to be very versatile and flexible inasmuch as the same can be used in many different applications even applications involving wells.

Other objects and advantages of the present invention will become apparent from a study of the following description and the accompanying drawings which are merely illustrative of such invention.

WATER COLLECTION AND METERING SYSTEM

Figure 1:
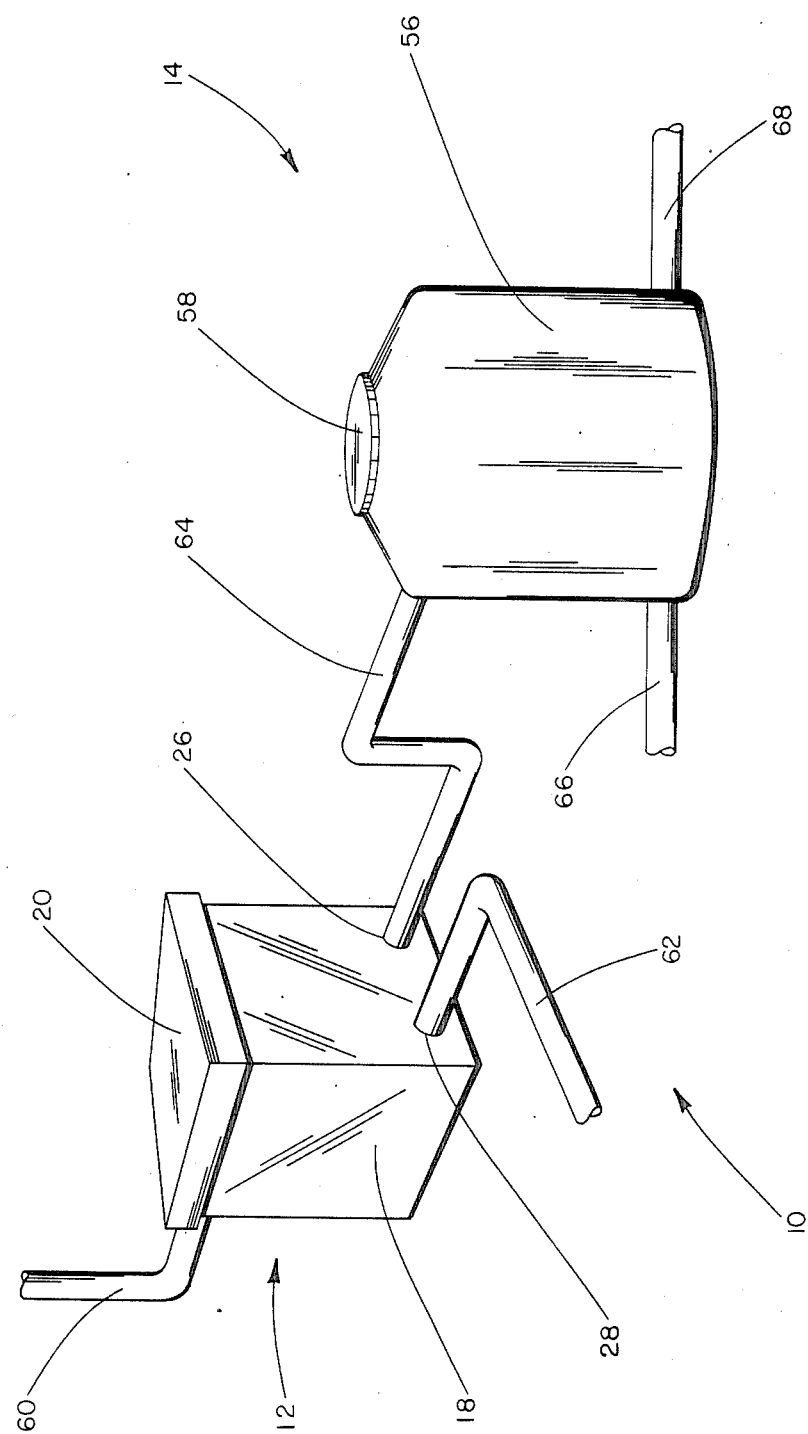
FIG. 1 is a diagrammatic illustration showing the basic components of the water collection and gauging system of the present invention.

With further reference to the drawings, the water collection and gauging system of the present invention is shown therein and indicated generally by the numeral 10. In FIG. 1, the basic system is illustrated and includes a spring box indicated generally by the numeral 12 which is designed to collect water from a source such as a spring. Spring box 12 is communicatively connected to a water holding tank 14 that is typically located adjacent or in the vicinity of the site where the ultimate use of the water takes place. It must be emphasized that FIG. 1 is diagrammatic and simply shows the basic components of the system and the various connecting lines that extend between the components. For example, line 64 in practice would always be inclined downwardly toward holding tank 14 in order that water would flow thereto under the influence.

Figure 2:
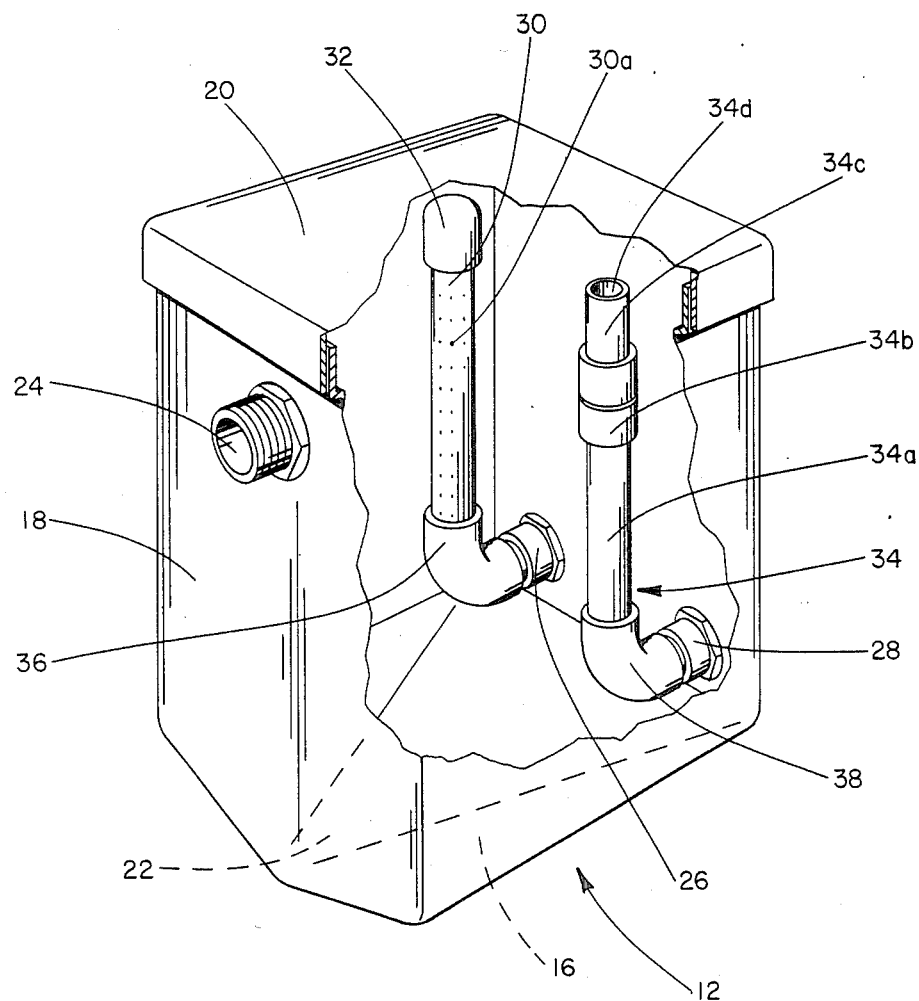
FIG. 2 is a perspective view of the spring box forming a part of the water collection and gauging system of the present invention with a side portion of the spring box being broken away to better illustrate the internal structure thereof.

First, the spring box 12, particularly shown in FIG. 2, will be described. It is seen that spring box 12 includes a special shaped bottom 16, a plurality of sides 18 and a removable top 20. This structure forms a water holding receptacle. In order that the spring box 12 may be of a lightweight and durable construction, the same is preferably constructed of polyethylene. It is appreciated, however, that other suitable materials may be utilized in the construction of the spring box 12.

As pointed out above, bottom 16 is particularly shaped to form a sediment receiving area indicated by the numeral 22. It is appreciated that due to the shape of the bottom 16 that sediment and other debris will tend to gravitate to and collect in the formed receiving area 22.

Formed in one side wall 18 is an inlet 24. Inlet 24 is secured in a tight and sealed manner to the sides 18 of spring box 12. In addition inlet 24 includes exterior threads in order that the same can be easily connected to compatible piping or conduit.

About the opposite side of spring box 12, there is provided a supply outlet 26 and a drain 28. Both supply outlet 26 and drain 28 are of the same basic nature as inlet 24 in that they are secured and sealed tightly to the spring box and include exterior threads. An elbow 36 is communicatively connected to the inside of supply outlet 26. Likewise, elbow 38 is connected to the inside of drain 28.

Secured into a top opening of elbow 36 is an upstanding water filter 30 that includes a top 32 secured over a top portion thereof. Water filter 30 includes a series of specially sized and spaced openings 30a through which water passes during the filtration process. The full significance of the sizing and spacing of openings 30a within filter 30 will be more fully appreciated after considering subsequent portions of this disclosure.

Figure 4:
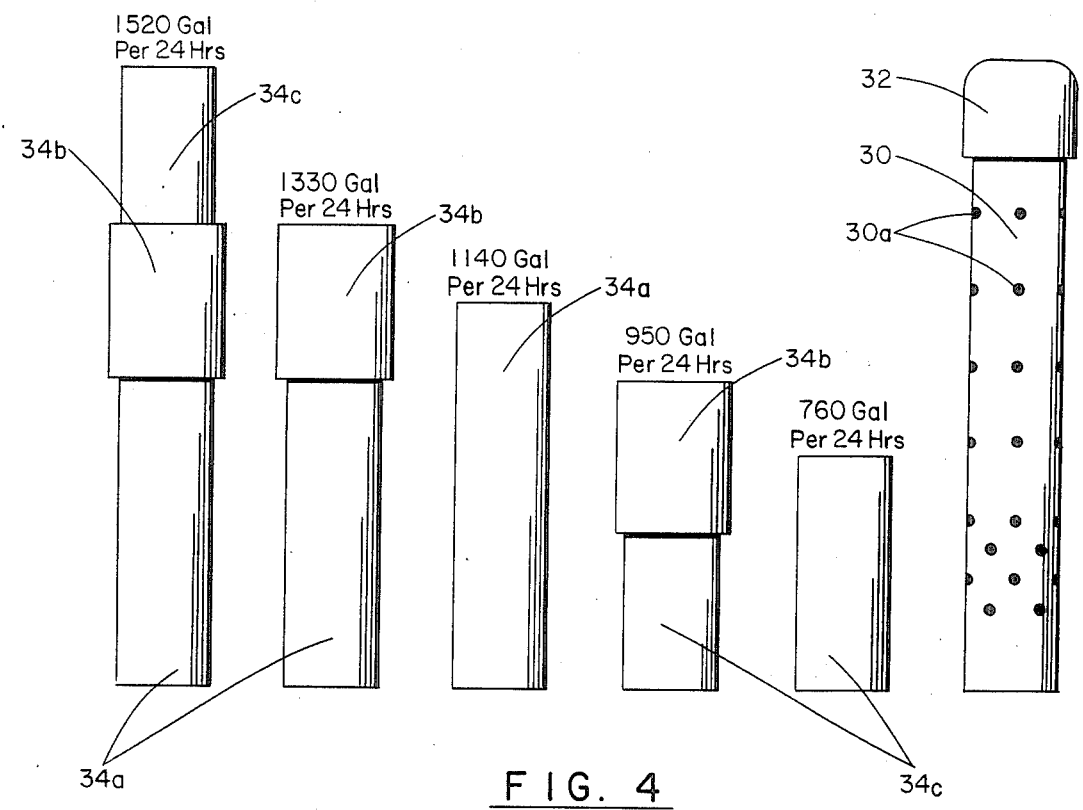
FIG. 4 is a graphic illustration of how the overflow pipe assembly can be broken down to control and vary the flow rate of water leaving the spring box.

Secured within a top opening of elbow 38 is an overflow pipe assembly indicated generally by the numeral 34. Overflow pipe assembly 34 includes a long nipple 34a, a coupler 34b and a short pipe 34c. The various components of the overflow pipe assembly just described can be easily connected and disconnected in various combinations as illustrated in FIG. 4.

Defined about the top of overflow pipe assembly 34 is an opening 34d that effectively establishes the water level within the spring box 12 at any time (with adequate supply).

Now turning to the water holding tank 14, the same includes a concave shaped bottom 54, a side wall structure 56, and a vented top 58. The concave shaped bottom 54 is specifically designed in order that sediment and other debris will gravitate to a selected area where the same can be easily removed.

Figure 3:
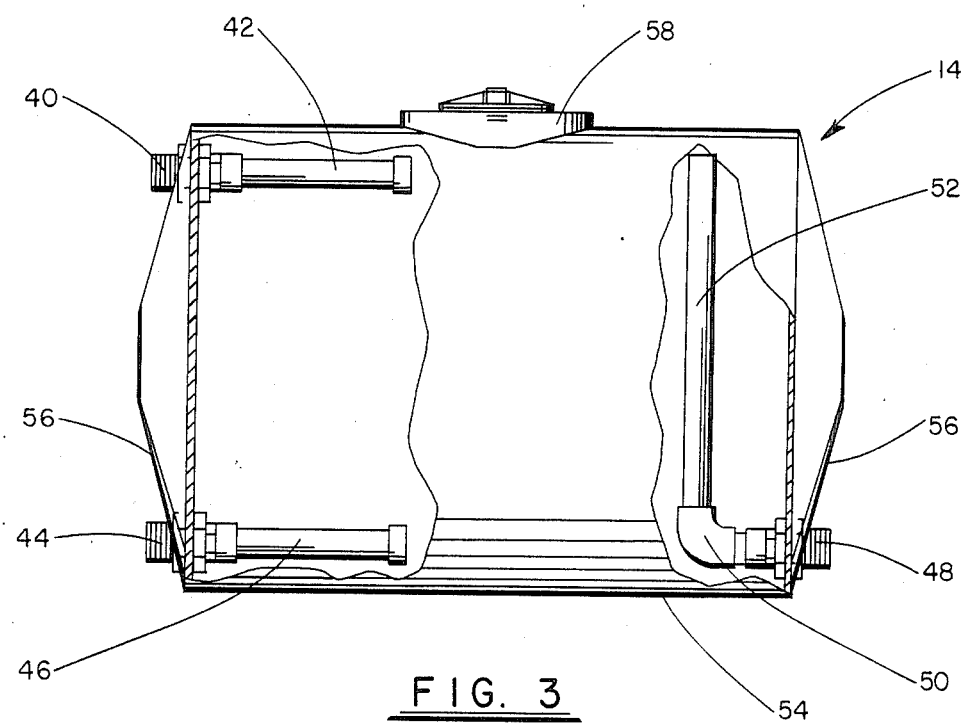
FIG. 3 is a side elevational view illustrating the water holding tank forming a part of the water collection and gauging system of the present invention.

Formed about an upper portion of the side wall 56 of the water holding tank 14 is an inlet 40. Inlet 40 is similar to the other fittings described hereinbefore with respect to the spring box. That is, inlet 40 is threaded and secured and sealed tightly to the wall structure 56 of the water holding tank 14. As illustrated in FIG. 3, an elongated water filter 42 is secured to inlet 40 and extends in a horizontal fashion interiorly of tank 14.

Spaced below outlet 40 adjacent bottom 54 of tank 14 is an outlet 44 which is similar in structure to the fitting that forms inlet 40. Secured to outlet 44 is another water filter 46 that is also horizontally disposed and which acts to filter water leaving tank 14 via outlet 44. Both water filters 42 and 46 include a series of openings formed therein.

Formed about the opposite side of tank 14 is a drain outlet 48 that again is sealed and secured tightly to the wall structure of the tank and includes exterior threads formed thereon. An elbow 50 is disposed interiorly of tank 14 and is communicatively connected to outlet 48. Elbow 50 includes an upper opening that is adapted to receive and hold an overflow outlet or pipe 52.

In forming a typical system, an inlet line 60 is connected to inlet 24 of spring box 12 (FIG. 1). Inlet line 60 would convey water from a source such as a spring into the spring box 12.

Extending from the spring box 12 would be a drain line 62 which would be secured to drain outlet 28 and a water supply line 64 which would be interconnected between supply outlet 26 of the spring box 12 and inlet 40 of tank 14. Finally, a final supply line 66 would extend from outlet 44 of the water holding tank 14 while a drain line 68 would be communicatively connected to drain outlet 48.

In setting up the present system, its design enables one to set a certain daily water capacity. That is, the user would determine how many gallons per day would be required for his or her needs and the system would be set accordingly. In this regard, spring box 12 is designed so as to vary and control the flow rate of water passing from supply outlet 26 thereof. In this regard, it is the co-operative relationship of the overflow pipe assembly 34 and the specially designed water filter 30 that accomplishes this function. The overflow pipe assembly 34 is designed such that the water level within the spring box 12 can be varied and adjusted by effectively varying and adjusting the height of the pipe assembly 34. By varying the height of the water level within spring box 12, the flow rate passing through the water filter 30 is likewise varied because of the orientation of the filter and the spacing and sizing of the respective openings 30a.

To more fully explain, one is referred to the illustration found in FIG. 4. As seen therein by simply using the short nipple 34c produces 760 gallons of water per day. One can increase the capacity and flow rate to 950 gallons per day by raising the level of water maintained within the spring box 12 by adding the coupler 34b to the short nipple section 34c. Capacity and flow rate can still be increased by simply using the long nipple 34a which gives a capacity of 1140 gallons per day. 1330 gallons per day can be achieved by combining the long nipple 34a with coupler 34b. Still more capacity, 1520 gallons per day can be achieved by combining all three sections 34a, 34b and 34c.

In addition the water filter 30 is designed such that it can be reversed. In a reversed position with only the short nipple 34c the spring box 12 will produce 380 gallons per day. Also by reversing water filter 30 and utilizing short nipple 34c along with coupler 34b a capacity of 570 gallons per day can be achieved.

In summary the following table illustrates certain various capacities that can be achieved by a particular spring box design.

| DESIRED GALLONS | OVERFLOW PIPE ARRANGEMENT | FILTER PIPE POSITION |
| --- | --- | --- |
| 380 | Set short nipple 34c | Reverse filter |
| 570 | Set short nipple 34c with coupler 34b | Reverse filter |
| 760 | Set short nipple 34c | Upright as shown in FIG. 4 |
| 950 | Set short nipple 34c with coupler 34b | Upright as shown in FIG. 4 |
| 1140 | Set long nipple 34a | Upright as shown in FIG. 4 |
| 1330 | Set long nipple 34a with coupler 34b | Upright as shown in FIG. 4 |
| 1520 | Set long nipple 34a with coupler 34b and short nipple 34c | Upright as shown in FIG. 4 |

It is appreciated that overflow pipe assembly 34 could be designed to include any number of sections with respective sections being of any selected length. In addition water filter can be particularly designed by selectively sizing the openings 30a and selectively spacing the same. Thus it is appreciated that a wide range of capacities and flow rates can be achieved.

Also it should be noted that to shut the water flow off completely a respective section of the overflow pipe assembly 34a can be set in elbow 36 and top 32 placed thereon. That effectively prevents flow through the supply outlet 26.

With respect to tank 14, it is seen that the same can be drained by simply removing the overflow pipe 52. In addition the water filters 42 and 44 are specifically designed to clean the water flowing through the system. The design of the water filters are such that spring lizards are prevented from passing therethrough. In fact the water filters are designed such that the spring lizards might swim back upstream thereby avoiding being caught within the filter.

The water collection and gauging system just described is very flexible and has many varied applications. It can be used in conjunction with springs or wells or other water sources. The spring box, for example, can be altered to include one or more additional supply outlets with an associated filter and one spring box can serve two or more water holding tanks. In addition one water tank 14 can be communicatively connected to another such that the overflow of one tank is directed into the inlet of a second tank.

Therefore, it is appreciated that various combinations of water tanks can be utilized in conjunction with the spring box 12 of the present invention to meet the needs of an individual or even a community. Also, the spring box can be altered with respect to the gauging components thereof to fit many different situations.

From the foregoing discussion and specification, it is seen that the water collecting and gauging system of the present invention is advantageous inasmuch as it can be designed and set to produce a certain capacity and flow of water for a certain need. By adjusting the water level within the spring box and designing the water filter 30 therein, various capacities can be arranged.

Finally spring box 12 and tank 14 are made of a lightweight, durable polyethylene material which makes them relatively inexpensive and easy to handle and install.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended Claims are intended to be embraced therein.

What is claimed is:

1. A spring box for collecting and gauging water comprising: a box type water holding structure including a bottom, side walls, and a top; a water inlet formed in said box type structure for directing water from a source such as a spring into said box; and supply outlet means for directing a constant flow rate of water from said spring box; an elongated water filter operatively connected to said supply outlet means and extending generally vertically therefrom; a drain outlet formed in the box type water holding structure; an overflow pipe assembly operatively connected to said drain outlet and extending generally vertically therefrom and including a drain opening for receiving water which is directed through said overflow pipe assembly and out said drain outlet; and co-operative control means associated with both said filter and said overflow pipe assembly for co-operatively gauging and varying the flow of water from the spring box, said co-operative control means including co-operative means for varying the height of water maintained in the spring box and for varying the rate of water flow per increment of increase or decrease in the water height from the spring box; said co-operative control means including a series of openings strategically spaced along the water filter for varying the flow of water from the spring box relative to the height of the water maintained in the spring box at any one time and for varying the rate of increase or decrease of flow relative to incremental increases or decreases in the height of the water, and means for vertically adjusting the drain opening on the overflow pipe assembly so as to consequently adjust the level of water normally maintained in the spring box which in turn in co-operation with the strategically spaced openings on the filter is effective to vary the flow rate of water from the spring box.

2. The spring box of claim 1 wherein said overflow pipe assembly includes a plurality of open ended pipe sections adapted to be joined together in end-to-end relationship whereby by selectively connecting the respective pipe sections together one can adjust and vary the water level normally maintained within said spring box.

3. The spring box of claim 2 wherein said openings of said water filter are sized and spaced relative to the various water levels that may be maintained by said overflow pipe assembly such that for each particular water level that may be maintained the openings within said water filter are designed to yield a certain flow rate of water through the water filter and out said supply outlet.

4. The spring box of claim 3 wherein said water filter includes a removable top cap and wherein said overflow pipe assembly and water filter are interchangeable such that said overflow pipe assembly may occupy the normal position held by said water filter and by placing said removable cap about the drain opening of said overflow pipe one can effectively stop the flow of water from said supply outlet.

5. The spring box of claim 1 further including a pair of elbow joints, one elbow joint operatively connected between said drain outlet and said overflow pipe assembly and the second elbow joint being operatively interposed between said supply outlet and said water filter.

6. The spring box of claim 1 wherein said box type water holding structure is formed of polyethylene.

7. The spring box of claim 6 including a series of fittings secured to said polyethylene spring box for receiving and accommodating the water inlet and supply and drain outlets.

8. The spring box of claim 1 further including a settling area formed about a portion of the bottom of said spring box for collecting debris that settles and collects in the spring box.

9. The spring box of claim 1 wherein the same is designed to be communicatively connected to a water holding tank to form a water collection and holding system, said water holding tank comprising: a tank type structure including a bottom, a surrounding side wall structure, a top; a water inlet formed in said water holding tank and operative to be communicatively connected to the supply outlet of said spring box; an outlet formed in the tank type structure forming the water holding tank; a filter operatively connected to said outlet of said water holding tank; and a drain outlet formed in said water holding tank and having an upstanding overflow outlet connected thereto.

10. The spring box and holding tank water system of claim 9 wherein said water inlet and outlets of said water holding tank are vertically spaced with said inlet assuming an elevated position over said outlet.

11. The water collecting and holding system of claim 10 wherein said water holding tank is provided with a vent structure that allows air to escape as water enters the same.

12. The water collecting and holding system of claim 11 wherein there is provided an elongated water filter communicatively connected to the inlet of said water holding tank.

13. The water collecting and holding system of claim 12 wherein the drain outlet of said water holding tank is disposed adjacent the bottom thereof and wherein said overflow outlet is communicatively connected to said drain outlet and wherein said overflow outlet is removably mounted such that said drain outlet may be utilized to drain the water holding tank.

14. The water collecting and holding system of claim 13 wherein the bottom of said water holding tank has formed therein a sediment receiving area whereby the sediment transferred into the water holding tank tends to gravitate and communicate.

15. The water collecting and holding system of claim 14 wherein said water holding tank is formed of a polyethylene material and includes a series of fittings secured to the water holding tank and wherein the respective fittings are adapted to be connected to the various outlets and the water inlet.

16. A method of collecting and gauging water comprising the steps of: directing water into a spring box; filling said spring box to a selected level; maintaining the water level within said spring box at said selected level; draining excessive water from the upper water level within said spring box so as to maintain the selective water level within the spring box; filtering the water by vertically orienting a water filter within said spring box and directing the filtered water from said spring box at a constant flow rate; and co-operatively controlling and varying the flow of water leaving the spring box by: (1) varying the height of the water level within said spring box relative to the water filter; and (2) increasing and decreasing the rate of flow per increment of increase or decrease in the water height within the spring box such that the overall rate of flow of water from the spring box is varied by adjusting the height of water within the spring box while increasing and decreasing the rate of flow per increment of variation in the height of the water within the spring box.

17. The method of collecting and gauging water of claim 16 further including the step of directing water from the spring box to a water holding tank and filtering the water prior to its deposit in the water holding tank.

18. The method of claim 16 wherein the step of varying the flow rate of water from said spring box by varying the height of the water level within the spring box includes the step of varying the height of an overflow pipe assembly by adding or removing one or more pipe sections from the overflow pipe assembly.

19. The method of claim 18 including the step of orienting said water filter within said spring box such that it extends vertically; and strategically placing openings up and down said water filter such that the rate of flow passing through said water filter will vary according to the height of the water level maintained in said spring box.

20. A water collection and holding system comprising: a spring box having a water inlet; a supply outet; means associated with said spring box for maintaining a substantial water level therein; drain means for draining excessive water from the spring box so as to maintain a selected water level in the spring box; means for gauging the rate of water flow from the spring box and through the supply outlet; a water holding and collection tank communicatively connected to said spring box for receiving water therefrom; said water holding tank including a tank structure having a bottom, a surrounding wall structure, and a top; a water inlet formed in an upper portion of the water holding tank; means operatively interconnecting said supply outlet of said spring box with the inlet formed in the water holding tank; a filter associated with the inlet of said water holding tank for filtering incoming water prior to entry into the water holding tank; an outlet formed in the lower portion of the water holding tank and spaced substantially below the inlet formed in the water holding tank such that when water is being directed from the water holding tank that a circulation of water is established by the downward movement of water from the inlet formed in the water holding tank to the outlet formed in the water holding tank; a drain assembly associated with said water holding tank for draining excessive water therefrom and for maintaining the water level within the water holding a tank at a selected level; said drain assembly including a lower drain outlet disposed in the lower portion of the water holding tank, and means operatively associated with the drain outlet of the water holding tank for establishing a selected water level within said water holding tank; said means for establishing the selected water level including a vertical drain pipe connected to the drain outlet of the water holding tank and extending upwardly a substantial distance within the water holding tank past said outlet of the water holding tank and having an upper terminal open end disposed at an upper level in said water holding tank, and wherein the orientation and spacing of said inlet, outlet and vertical drain pipe of said water holding tank assures continuous circulation of water from the inlet of the water holding tank to either the outlet or the drain pipe of the water holding tank thereby assuring that the water is maintained fresh and does not freeze.

21. A sealed water holding tank for filtering, circulating, holding, water for domestic use comprising: a sealed tank structure having a bottom, surrounding side wall structure, and a top with a vented opening formed therein; an inlet formed about a top portion of the surrounding side wall structure for allowing water to pass from a supply source to the interior of the tank; an elongated inlet filter secured to the inlet and extending horizontally therefrom through the interior of the tank; a supply outlet formed in a lower portion of the surrounding side wall structure of the tank and operative to direct water from the tank to a domestic household; an elongated outlet filter secured to the supply outlet and extending horizontally and inwardly therefrom through the interior of the tank, and wherein the inlet and outlet elongated filters are vertically spaced and extend in parallel relationship through the interior of the tank; a drain outlet formed in the bottom portion of the side wall structure at a position diametrically opposite that of the inlet such that the drain outlet and the inlet are located opposite each other at vertically spaced levels; a drain pipe connected to the drain outlet and extending upwardly therefrom in close proximity to the surrounding wall structure disposed over the drain outlet such that the drain pipe is spaced opposite the inlet; the drain pipe extending upwardly within the interior of the water holding tank and including an upper terminal open end disposed in an upper level of the water holding tank, and wherein the drain pipe and its upper terminal open end function to establish a selected water level within the tank; and wherein the drain pipe is removably mounted from the drain outlet so as to allow the tank to be completely drained and cleaned; and wherein the arrangement, positioning and spacing of the inlet, supply outlet, drain outlet, and upper open end of the drain pipe create a water circulation pattern that results in water moving from the inlet across the tank to the upper open end of the drain pipe, and futher from the inlet downwardly to the supply outlet in such a fashion that the circulation maintains a fresh quality in the water and prevents the water from freezing.

* * * * *